United States Patent
Bañares et al.

(10) Patent No.: US 11,975,665 B2
(45) Date of Patent: May 7, 2024

(54) ELECTRICAL ASSEMBLY

(71) Applicant: Lear Corporation, Southfield, MI (US)

(72) Inventors: Jose Gabriel Fernández Bañares, Valls (ES); Raúl Ricart, Valls (ES); Esteban Herrera, Valls (ES)

(73) Assignee: Lear Corporation, Southfield, MI (US)

( * ) Notice: Subject to any disclaimer, the term of this patent is extended or adjusted under 35 U.S.C. 154(b) by 831 days.

(21) Appl. No.: 16/784,576

(22) Filed: Feb. 7, 2020

(65) Prior Publication Data

US 2020/0262367 A1    Aug. 20, 2020

Related U.S. Application Data

(60) Provisional application No. 62/807,827, filed on Feb. 20, 2019.

(51) Int. Cl.
*B60R 16/03* (2006.01)
*B60N 2/005* (2006.01)
*B60N 2/02* (2006.01)

(52) U.S. Cl.
CPC .............. *B60R 16/03* (2013.01); *B60N 2/005* (2013.01); *B60N 2/0224* (2013.01)

(58) Field of Classification Search
CPC ....... B60R 16/03; B60R 16/027; B60N 2/005; B60N 2/0224; B60N 2002/0264; B60N 2/0232; B60N 2/5678
See application file for complete search history.

(56) References Cited

U.S. PATENT DOCUMENTS

| | | | |
|---|---|---|---|
| 2,126,143 A | 8/1938 | McGregor |
| 2,263,554 A | 11/1941 | Brach |
| 2,480,622 A | 8/1949 | Warnock |

(Continued)

FOREIGN PATENT DOCUMENTS

| | | | |
|---|---|---|---|
| CN | 101067642 A | 11/2007 |
| CN | 203190203 U | 9/2013 |

(Continued)

OTHER PUBLICATIONS

Co-pending U.S. Appl. No. 16/597,187, filed Oct. 9, 2019.
(Continued)

*Primary Examiner* — Daniel Cavallari
*Assistant Examiner* — Brian K Baxter
(74) *Attorney, Agent, or Firm* — McGarry Bair PC (57) ABSTRACT

An electrical assembly includes a track assembly, a support member configured to move along the track assembly, a first ECU connected to the support member, and a second electronic control unit (ECU) connected to the track assembly and configured to provide power from a power source to the track assembly. The first ECU may be configured to disconnect the electrical load and/or cause the electrical load to operate in a low-current mode if a connection system is partially engaged. The second ECU may have a first mode in which the second ECU provides power in a first voltage range to the track assembly. The second ECU may have a second mode in which the second ECU provides power in a second voltage range. The second ECU may be configured to switch between the first mode and the second mode according to information from the first ECU.

20 Claims, 7 Drawing Sheets

(56) References Cited

U.S. PATENT DOCUMENTS

| | | |
|---|---|---|
| 2,678,082 A | 5/1954 | Nathan |
| 3,181,102 A | 4/1965 | Fehr |
| 3,213,403 A | 10/1965 | Hermann |
| 3,268,848 A | 8/1966 | Adams |
| 3,603,918 A | 9/1971 | Woertz |
| 3,933,403 A | 1/1976 | Rubesamen et al. |
| 3,940,182 A | 2/1976 | Tamura |
| 4,020,769 A | 5/1977 | Keir |
| 4,198,025 A | 4/1980 | Lowe et al. |
| 4,243,248 A | 1/1981 | Scholz et al. |
| 4,282,631 A | 8/1981 | Uehara et al. |
| 4,511,187 A | 4/1985 | Rees |
| 4,575,295 A | 3/1986 | Rebentisch |
| 4,618,808 A | 10/1986 | Ish-Shalom et al. |
| 4,707,030 A | 11/1987 | Harding |
| 4,711,589 A | 12/1987 | Goodbred |
| 4,763,360 A | 8/1988 | Daniels et al. |
| 4,776,809 A | 10/1988 | Hall |
| 4,830,531 A | 5/1989 | Condit et al. |
| 4,853,555 A | 8/1989 | Wheat |
| 4,961,559 A | 10/1990 | Raymor |
| 4,969,621 A | 11/1990 | Munchow et al. |
| 4,987,316 A | 1/1991 | White et al. |
| 5,137,331 A | 8/1992 | Colozza |
| 5,167,393 A | 12/1992 | Hayakawa et al. |
| 5,192,045 A | 3/1993 | Yamada et al. |
| 5,222,814 A | 6/1993 | Boelryk |
| 5,322,982 A | 6/1994 | Leger et al. |
| 5,332,290 A | 7/1994 | Borlinghaus et al. |
| 5,344,331 A | 9/1994 | Hoffman et al. |
| 5,348,373 A | 9/1994 | Stiennon |
| 5,362,241 A | 11/1994 | Matsuoka et al. |
| 5,446,442 A | 8/1995 | Swart et al. |
| 5,466,892 A | 11/1995 | Howard et al. |
| 5,489,173 A | 2/1996 | Hofle |
| 5,582,381 A | 12/1996 | Graf et al. |
| 5,599,086 A | 2/1997 | Dutta |
| 5,618,192 A | 4/1997 | Drury |
| 5,655,816 A | 8/1997 | Magnuson et al. |
| 5,676,341 A | 10/1997 | Tarusawa et al. |
| 5,696,409 A | 12/1997 | Handman et al. |
| 5,701,037 A | 12/1997 | Weber et al. |
| 5,796,177 A | 8/1998 | Werbelow et al. |
| 5,800,015 A | 9/1998 | Tsuchiya et al. |
| 5,899,532 A | 5/1999 | Paisley et al. |
| 5,918,847 A | 7/1999 | Couasnon |
| 5,921,606 A | 7/1999 | Moradell et al. |
| 5,964,442 A | 10/1999 | Wingblad et al. |
| 5,964,815 A | 10/1999 | Wallace et al. |
| 6,036,157 A | 3/2000 | Baroin et al. |
| 6,142,718 A | 11/2000 | Kroll |
| 6,150,774 A | 11/2000 | Mueller et al. |
| 6,166,451 A | 12/2000 | Pigott |
| 6,216,995 B1 | 4/2001 | Koester |
| 6,227,595 B1 | 5/2001 | Hamelin et al. |
| 6,290,516 B1 | 9/2001 | Gerber |
| 6,296,498 B1 | 10/2001 | Ross |
| 6,299,230 B1 | 10/2001 | Dettl |
| 6,318,802 B1 | 11/2001 | Sjostrom et al. |
| 6,325,645 B1 | 12/2001 | Schuite |
| 6,357,814 B1 | 3/2002 | Boisset et al. |
| 6,400,259 B1 | 6/2002 | Bourcart et al. |
| 6,405,988 B1 | 6/2002 | Taylor et al. |
| 6,422,596 B1 | 7/2002 | Fendt et al. |
| 6,439,531 B1 | 8/2002 | Severini et al. |
| 6,480,144 B1 | 11/2002 | Miller et al. |
| 6,693,368 B2 | 2/2004 | Schumann et al. |
| 6,710,470 B2 | 3/2004 | Bauer et al. |
| 6,719,350 B2 | 4/2004 | Duchateau et al. |
| 6,736,458 B2 | 5/2004 | Chabanne et al. |
| 6,772,056 B2 | 8/2004 | Mattes et al. |
| 6,805,375 B2 | 10/2004 | Enders et al. |
| 6,851,708 B2 | 2/2005 | Kazmierczak |
| 6,882,162 B2 | 4/2005 | Schirmer et al. |
| 6,960,993 B2 | 11/2005 | Mattes et al. |
| 7,042,342 B2 | 5/2006 | Luo et al. |
| 7,083,437 B2 | 8/2006 | Mackness |
| 7,086,874 B2 | 8/2006 | Mitchell et al. |
| 7,113,541 B1 | 9/2006 | Lys et al. |
| 7,159,899 B2 | 1/2007 | Nitschke et al. |
| 7,170,192 B2 | 1/2007 | Kazmierczak |
| 7,188,805 B2 | 3/2007 | Henley et al. |
| 7,207,541 B2 | 4/2007 | Frohnhaus et al. |
| 7,271,501 B2 | 9/2007 | Dukart et al. |
| 7,288,009 B2 | 10/2007 | Lawrence et al. |
| 7,293,831 B2 | 11/2007 | Greene |
| 7,300,091 B2 | 11/2007 | Nihonmatsu et al. |
| 7,322,605 B2 | 1/2008 | Ventura et al. |
| 7,348,687 B2 | 3/2008 | Aichriedler et al. |
| 7,363,194 B2 | 4/2008 | Schlick et al. |
| 7,370,831 B2 | 5/2008 | Laib et al. |
| 7,388,466 B2 | 6/2008 | Ghabra et al. |
| 7,389,960 B2 | 6/2008 | Mitchell et al. |
| 7,416,042 B2 | 8/2008 | Czaykowska et al. |
| 7,434,883 B2 | 10/2008 | Deptolla |
| 7,454,170 B2 | 11/2008 | Goossens et al. |
| 7,455,535 B2 | 11/2008 | Insalaco et al. |
| 7,503,522 B2 | 3/2009 | Henley et al. |
| 7,505,754 B2 | 3/2009 | Kazmierczak et al. |
| 7,523,913 B2 | 4/2009 | Mizuno et al. |
| 7,556,233 B2 | 7/2009 | Gryp et al. |
| 7,560,827 B2 | 7/2009 | Jacas-Miret et al. |
| 7,633,301 B2 | 12/2009 | Steenwyk et al. |
| 7,661,637 B2 | 2/2010 | Mejuhas et al. |
| 7,665,939 B1 | 2/2010 | Cardona |
| 7,739,820 B2 | 6/2010 | Frank |
| 7,744,386 B1 | 6/2010 | Speidel et al. |
| 7,980,525 B2 | 7/2011 | Kostin |
| 7,980,798 B1 | 7/2011 | Kuehn et al. |
| 8,010,255 B2 | 8/2011 | Darraba |
| 8,146,991 B2 | 4/2012 | Stanz et al. |
| 8,278,840 B2 | 10/2012 | Logiudice et al. |
| 8,282,326 B2 | 10/2012 | Krostue et al. |
| 8,376,675 B2 | 2/2013 | Schulze et al. |
| 8,463,501 B2 | 6/2013 | Jousse |
| 8,536,928 B1 | 9/2013 | Gagne et al. |
| 8,648,613 B2 | 2/2014 | Ewerhart et al. |
| 8,702,170 B2 | 4/2014 | Abraham et al. |
| 8,757,720 B2 | 6/2014 | Hurst, III et al. |
| 8,800,949 B2 | 8/2014 | Schebaum et al. |
| 8,857,778 B2 | 10/2014 | Nonomiya |
| 8,936,526 B2 | 1/2015 | Boutouil et al. |
| 8,967,719 B2 | 3/2015 | Ngiau et al. |
| RE45,456 E | 4/2015 | Sinclair et al. |
| 9,010,712 B2 | 4/2015 | Gray et al. |
| 9,018,869 B2 | 4/2015 | Yuasa et al. |
| 9,045,061 B2 | 6/2015 | Kostin et al. |
| 9,162,590 B2 | 10/2015 | Nagura et al. |
| 9,174,604 B2 | 11/2015 | Wellhoefer et al. |
| 9,242,580 B2 | 1/2016 | Schebaum et al. |
| 9,318,922 B2 | 4/2016 | Hall et al. |
| 9,340,125 B2 | 5/2016 | Stutika et al. |
| 9,346,428 B2 | 5/2016 | Bortolin |
| 9,422,058 B2 | 8/2016 | Fischer et al. |
| 9,561,770 B2 | 2/2017 | Sievers et al. |
| 9,608,392 B1 | 3/2017 | Destro |
| 9,610,862 B2 | 4/2017 | Bonk et al. |
| 9,663,232 B1 | 5/2017 | Porter et al. |
| 9,673,583 B2 | 6/2017 | Hudson et al. |
| 9,701,217 B2 | 7/2017 | Eckenroth et al. |
| 9,731,628 B1 | 8/2017 | Rao et al. |
| 9,758,061 B2 | 9/2017 | Pluta et al. |
| 9,789,834 B2 | 10/2017 | Rapp et al. |
| 9,796,304 B2 | 10/2017 | Salter et al. |
| 9,815,425 B2 | 11/2017 | Rao et al. |
| 9,821,681 B2 | 11/2017 | Rao et al. |
| 9,840,220 B2 | 12/2017 | Van Buskirk et al. |
| 9,919,624 B2 | 3/2018 | Cziomer et al. |
| 9,950,682 B1 | 4/2018 | Gramenos et al. |
| 10,059,232 B2 | 8/2018 | Frye et al. |
| 10,160,351 B2 | 12/2018 | Sugimoto et al. |
| 10,479,227 B2 | 11/2019 | Nolte et al. |
| 10,493,243 B1 | 12/2019 | Braham |
| 10,547,135 B2 | 1/2020 | Sugiura |

(56) References Cited

U.S. PATENT DOCUMENTS

| | | | |
|---|---|---|---|
| 10,549,659 B2 | 2/2020 | Sullivan et al. | |
| 10,654,378 B2 | 5/2020 | Pons | |
| 10,737,644 B2* | 8/2020 | Taylor | E04F 10/0607 |
| 2005/0046367 A1 | 3/2005 | Wevers et al. | |
| 2005/0089367 A1 | 4/2005 | Sempliner | |
| 2005/0150705 A1* | 7/2005 | Vincent | B60N 2/002 |
| | | | 180/271 |
| 2005/0211835 A1 | 9/2005 | Henley et al. | |
| 2005/0215098 A1 | 9/2005 | Muramatsu et al. | |
| 2005/0230543 A1 | 10/2005 | Laib et al. | |
| 2005/0258676 A1* | 11/2005 | Mitchell | B60N 2/0224 |
| | | | 297/216.13 |
| 2005/0283333 A1* | 12/2005 | Johannes | H01R 13/665 |
| | | | 702/156 |
| 2006/0131470 A1 | 6/2006 | Yamada et al. | |
| 2006/0208549 A1 | 9/2006 | Hancock et al. | |
| 2006/0220411 A1 | 10/2006 | Pathak et al. | |
| 2008/0021602 A1 | 1/2008 | Kingham et al. | |
| 2008/0084085 A1 | 4/2008 | Mizuno et al. | |
| 2008/0090432 A1 | 4/2008 | Patterson et al. | |
| 2009/0014584 A1 | 1/2009 | Rudduck et al. | |
| 2009/0129105 A1 | 5/2009 | Kusu et al. | |
| 2009/0251920 A1 | 10/2009 | Kino et al. | |
| 2009/0302665 A1 | 12/2009 | Dowty | |
| 2009/0319212 A1 | 12/2009 | Cech et al. | |
| 2010/0117275 A1 | 5/2010 | Nakamura | |
| 2011/0024595 A1 | 2/2011 | Oi et al. | |
| 2012/0112032 A1 | 5/2012 | Kohen | |
| 2013/0020459 A1 | 1/2013 | Moriyama et al. | |
| 2013/0035994 A1 | 2/2013 | Pattan et al. | |
| 2014/0263920 A1 | 9/2014 | Anticuar et al. | |
| 2014/0265479 A1 | 9/2014 | Bennett | |
| 2015/0048206 A1 | 2/2015 | Deloubes | |
| 2015/0069807 A1 | 3/2015 | Kienke | |
| 2015/0083882 A1 | 3/2015 | Stutika et al. | |
| 2015/0191106 A1 | 7/2015 | Inoue et al. | |
| 2015/0236462 A1 | 8/2015 | Davidson, Jr. et al. | |
| 2016/0039314 A1 | 2/2016 | Anticuar et al. | |
| 2016/0154170 A1 | 6/2016 | Thompson et al. | |
| 2016/0226236 A1* | 8/2016 | Djelassi | H02H 7/261 |
| 2016/0236613 A1 | 8/2016 | Trier | |
| 2017/0080825 A1 | 3/2017 | Bonk et al. | |
| 2017/0080826 A1 | 3/2017 | Bonk et al. | |
| 2017/0166093 A1 | 6/2017 | Cziomer et al. | |
| 2017/0253246 A1* | 9/2017 | Graf | B60W 30/1884 |
| 2017/0261343 A1 | 9/2017 | Lanter et al. | |
| 2017/0291507 A1 | 10/2017 | Hattori et al. | |
| 2018/0017189 A1 | 1/2018 | Wegner | |
| 2018/0039917 A1 | 2/2018 | Buttolo et al. | |
| 2018/0086232 A1 | 3/2018 | Kume | |
| 2018/0105072 A1 | 4/2018 | Pons | |
| 2018/0148011 A1 | 5/2018 | Zaugg et al. | |
| 2018/0183623 A1 | 6/2018 | Schoenfeld et al. | |
| 2018/0275648 A1 | 9/2018 | Ramalingam | |
| 2018/0334054 A1* | 11/2018 | Higuchi | B60N 2/06 |
| 2019/0001846 A1 | 1/2019 | Jackson et al. | |
| 2019/0084453 A1 | 3/2019 | Petit et al. | |
| 2019/0089093 A1* | 3/2019 | Liu | H01R 13/187 |
| 2019/0126786 A1 | 5/2019 | Dry et al. | |
| 2019/0337413 A1 | 11/2019 | Romer | |
| 2019/0337414 A1 | 11/2019 | Condamin et al. | |
| 2019/0337415 A1 | 11/2019 | Condamin et al. | |
| 2019/0337416 A1 | 11/2019 | Condamin et al. | |
| 2019/0337417 A1 | 11/2019 | Condamin et al. | |
| 2019/0337418 A1 | 11/2019 | Condamin et al. | |
| 2019/0337419 A1 | 11/2019 | Condamin et al. | |
| 2019/0337420 A1 | 11/2019 | Condamin et al. | |
| 2019/0337421 A1 | 11/2019 | Condamin et al. | |
| 2019/0337422 A1 | 11/2019 | Condamin et al. | |
| 2019/0337471 A1 | 11/2019 | Brehm | |
| 2019/0379187 A1 | 12/2019 | Christensen et al. | |
| 2019/0389336 A1 | 12/2019 | Malinowski et al. | |
| 2020/0009995 A1* | 1/2020 | Sonar | B60N 2/0818 |
| 2020/0055423 A1 | 2/2020 | Prozzi et al. | |
| 2020/0079244 A1 | 3/2020 | Carbone et al. | |
| 2020/0180516 A1 | 6/2020 | Moulin | |
| 2020/0180517 A1 | 6/2020 | Moulin | |
| 2020/0189504 A1 | 6/2020 | Ricart et al. | |
| 2020/0189511 A1 | 6/2020 | Ricart et al. | |
| 2020/0194936 A1 | 6/2020 | Ricart et al. | |
| 2020/0194948 A1 | 6/2020 | Lammers et al. | |
| 2020/0207241 A1 | 7/2020 | Moulin et al. | |
| 2020/0269754 A1 | 8/2020 | Ricart et al. | |
| 2020/0282871 A1 | 9/2020 | Ricart et al. | |
| 2020/0282880 A1 | 9/2020 | Jones et al. | |

FOREIGN PATENT DOCUMENTS

| | | |
|---|---|---|
| CN | 203799201 U | 8/2014 |
| CN | 104554746 A | 4/2015 |
| CN | 105843087 A | 8/2016 |
| DE | 3710476 A1 | 10/1987 |
| DE | 29712180 U1 | 9/1997 |
| DE | 10164068 A1 | 4/2003 |
| DE | 10258837 B3 | 4/2004 |
| DE | 202005013714 U1 | 12/2005 |
| DE | 102005007430 A1 | 3/2006 |
| DE | 102006022032 A1 | 12/2006 |
| DE | 102010017038 A1 | 2/2011 |
| DE | 102010063615 A1 | 2/2012 |
| DE | 102011056278 A1 | 2/2013 |
| DE | 202014102336 U1 | 6/2014 |
| DE | 102014217754 A1 | 3/2015 |
| DE | 102015212100 A1 | 12/2015 |
| DE | 112015000380 T5 | 10/2016 |
| DE | 102016113409 A1 | 4/2017 |
| EP | 0565973 A1 | 10/1993 |
| EP | 0783990 A1 | 7/1997 |
| EP | 1176047 A1 | 1/2002 |
| EP | 1209024 A1 | 5/2002 |
| EP | 1431104 A2 | 6/2004 |
| EP | 2298609 B1 | 3/2011 |
| EP | 1699661 B1 | 8/2012 |
| EP | 3150426 A1 | 4/2017 |
| FR | 2762814 A1 | 11/1998 |
| FR | 2864481 B1 | 4/2006 |
| FR | 2951329 A1 | 4/2011 |
| FR | 2986751 A1 | 8/2013 |
| JP | 3314591 B2 | 8/2002 |
| JP | 2003227703 A | 8/2003 |
| JP | 2005119518 A | 5/2005 |
| JP | 2007112174 A | 5/2007 |
| JP | 2008158578 A | 7/2008 |
| JP | 4222262 B2 | 2/2009 |
| JP | 2013230721 A | 11/2013 |
| WO | 01/87665 A1 | 11/2001 |
| WO | 2003002256 A2 | 1/2003 |
| WO | 2004098943 A1 | 11/2004 |
| WO | 2005068247 A2 | 7/2005 |

OTHER PUBLICATIONS

Co-pending U.S. Appl. No. 16/672,989, filed Nov. 4, 2019.
Co-pending U.S. Appl. No. 16/711,661, filed Dec. 12, 2019.
Chinese Office Action dated Feb. 7, 2022 corresponding to Chinese Patent Application No. 202010106807.9.
Chinese Office Action dated Sep. 2, 2022 for Chinese Patent App. 202010106807.9.

\* cited by examiner

ELECTRICAL ASSEMBLY

CROSS-REFERENCE TO RELATED APPLICATION

This application claims the benefit of U.S. Provisional Patent Application Ser. No. 62/807,827, filed on Feb. 20, 2019, the disclosure of which is hereby incorporated by reference in its entirety as though fully set forth herein.

TECHNICAL FIELD

The present disclosure generally relates to electrical assemblies, including electrical assemblies that may be used in connection with tracks, such as vehicle seat tracks.

BACKGROUND

This background description is set forth below for the purpose of providing context only. Therefore, any aspect of this background description, to the extent that it does not otherwise qualify as prior art, is neither expressly nor impliedly admitted as prior art against the instant disclosure.

Some electrical assemblies may not be configured for support assemblies that may be selectively electrically and mechanically connected to track assemblies. Some electrical assemblies may not operate efficiently or effectively.

There is a desire for solutions/options that minimize or eliminate one or more challenges or shortcomings of electrical assemblies. The foregoing discussion is intended only to illustrate examples of the present field and should not be taken as a disavowal of scope.

SUMMARY

In embodiments, an electrical assembly may include a track assembly, a support member configured for connection with the track assembly, an electrical load, an electronic control unit (ECU), and/or a connection system including an electrical contact that may be connected to the support assembly. The electrical contact may be configured for selective electrical connection with said track assembly (e.g., may be connected to and disconnected from said track assembly). The electrical assembly may include a sensor that may be configured to sense a status of the connection system. The ECU may be configured to disconnect the electrical load and/or cause the electrical load to operate in a low-current mode if the status of the connection system is not fully engaged (e.g., is partially engaged or not engaged). The electrical assembly may include an additional ECU that may be connected to said track assembly. The additional ECU may be configured to communicate with at least one of the ECU and the sensor. The additional ECU may be configured to supply a reduced voltage if the status of the connection system is partially engaged. The reduced voltage may be about 5 V or less. The electrical assembly may include one or more additional electrical loads. The electrical load may be a motor and/or one or more additional electrical loads may include a heater.

With embodiments, the ECU may include a high-current mode and/or a low-current mode. The ECU may be configured to switch from the high-current mode to the low-current mode, such as if the status of the connection system is partially engaged. The electrical contact may be configured to rotate about a substantially vertical axis. The support assembly may be configured to be selectively vertically connectable with said track assembly. The support assembly may include a seat. The electrical assembly may include a second electrical contact that may be configured for selective electrical connection with a second track of the track assembly. The electrical assembly may include a first sensor and a second sensor. The electrical contact may be configured for selective electrical connection with a first track of the track assembly. The connection system may not be fully disengaged until both of the electrical contact and the second electrical contact are disconnected from the first track and the second track, respectively. The first sensor may be configured to detect a position of the electrical contact. The second sensor may be configured to detect a position of the second electrical contact.

In embodiments, the first track may include a first inner track, a first outer track, and/or a first conductor disposed at least partially in a wall of the first outer track. The second track may include a second inner track, a second outer track, and/or a second conductor disposed at least partially in a wall of the second outer track. The electrical contact may be configured for selective electrical connection with the first conductor. The second electrical contact may be configured for selective electrical connection with the second conductor. The electrical contact may be configured for selective electrical connection with the second conductor. The second electrical conductor may be configured for selective electrical connection with the first conductor.

With embodiments, an electrical assembly may include a track assembly, a support assembly configured to move along the track assembly, and/or an electronic control unit (ECU) that may be connected to the track assembly. The ECU may be configured to provide power from a power source to the track assembly. The ECU may include a first mode in which the ECU provides power in a first voltage range to the track assembly. The ECU may include a second mode in which the ECU provides power in a second voltage range to the track assembly. The ECU may be configured to switch between the first mode and the second mode according to information regarding the support assembly. The first voltage range may include voltages of at least about 12 V. The first voltage range may include voltages of at least about 36 V. The second voltage range may include voltages of about 8 V or less. The second voltage range includes voltages of about 5 V. The support assembly may include an additional ECU, a support member connected to the track assembly, and/or a seat connected to move with the support member. The support assembly may include a motor connected to move the seat. The additional ECU may be configured to control operation of the motor. The electrical assembly may include a switch connected to the additional ECU and/or may be configured to receive user input. The electrical assembly may include a blocker. The blocker may be configured to restrict disconnection of the support assembly from the track assembly when the ECU is in the first mode. The electrical assembly may include an occupancy sensor that may be connected to the blocker. The blocker may be configured to restrict disconnection of the support assembly from the track assembly when the ECU determines that the support assembly is occupied via the occupancy sensor.

The foregoing and other aspects, features, details, utilities, and/or advantages of embodiments of the present disclosure will be apparent from reading the following description, and from reviewing the accompanying drawings.

BRIEF DESCRIPTION OF THE DRAWINGS

While the claims are not limited to a specific illustration, an appreciation of various aspects may be gained through a discussion of various examples. The drawings are not necessarily to scale, and certain features may be exaggerated or hidden to better illustrate and explain an innovative aspect of an example. Further, the exemplary illustrations described herein are not exhaustive or otherwise limiting, and are not restricted to the precise form and configuration shown in the drawings or disclosed in the following detailed description. Exemplary illustrations are described in detail by referring to the drawings as follows:

DETAILED DESCRIPTION

Reference will now be made in detail to embodiments of the present disclosure, examples of which are described herein and illustrated in the accompanying drawings. While the present disclosure will be described in conjunction with embodiments and/or examples, it will be understood that they do not limit the present disclosure to these embodiments and/or examples. On the contrary, the present disclosure covers alternatives, modifications, and equivalents.

Figure 1:
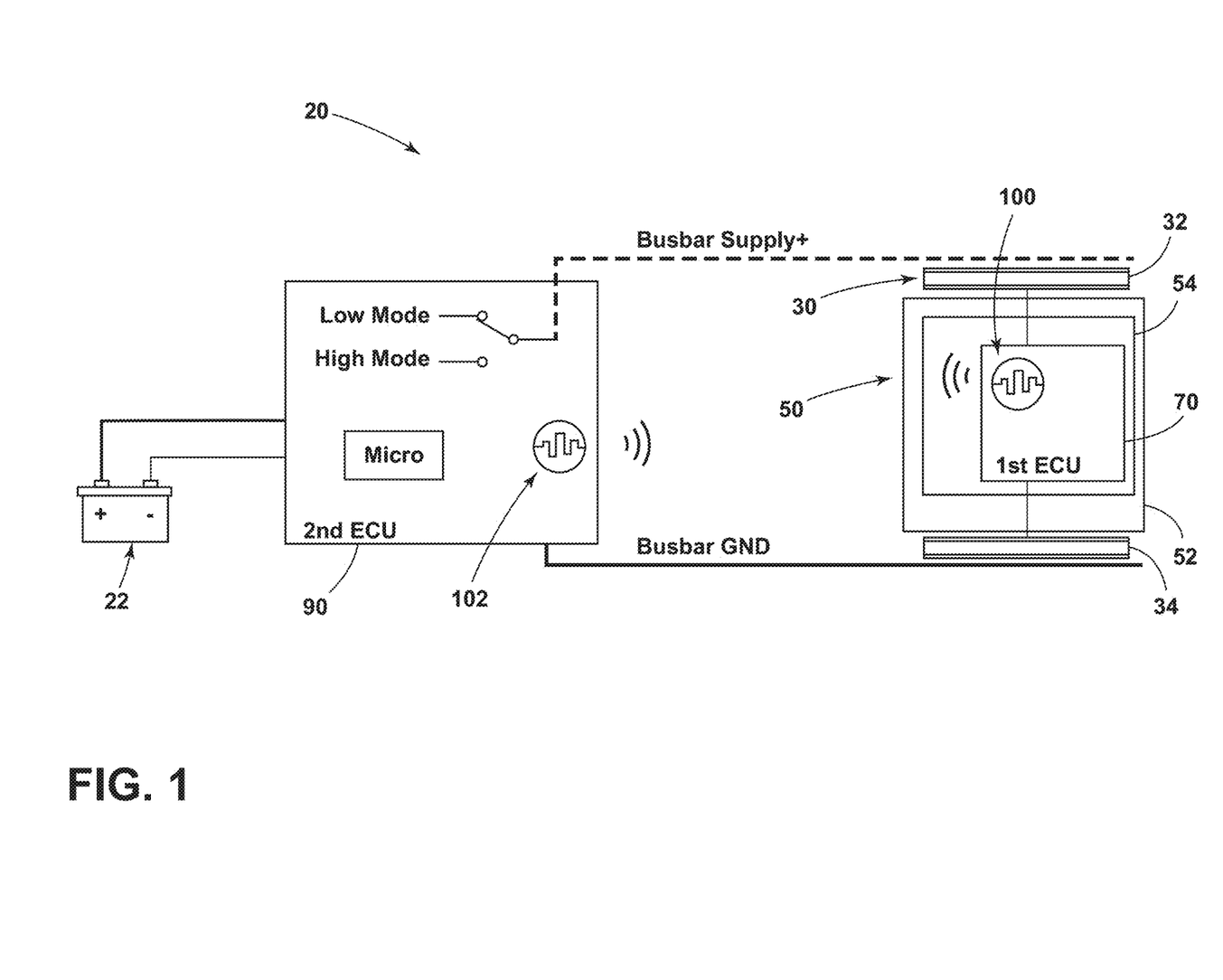
FIG. 1 is a schematic view of an embodiment of an electrical assembly according to teachings of the present disclosure.

In embodiments, such as generally illustrated in FIG. 1, an electrical assembly 20 may include a track assembly 30, a support assembly 50, a first electronic control unit (ECU) 70, and/or a second ECU 90. The second ECU 90 may be configured for connection with a power source 22 (e.g., a direct current or DC power source). The second ECU 90 may selectively provide DC power from the power source 22 to the track assembly 30 and/or may control the power (e.g., voltage, current, etc.) provided to the track assembly 30. The second ECU 90 may, for example and without limitation, be a vehicle ECU.

Figure 2:
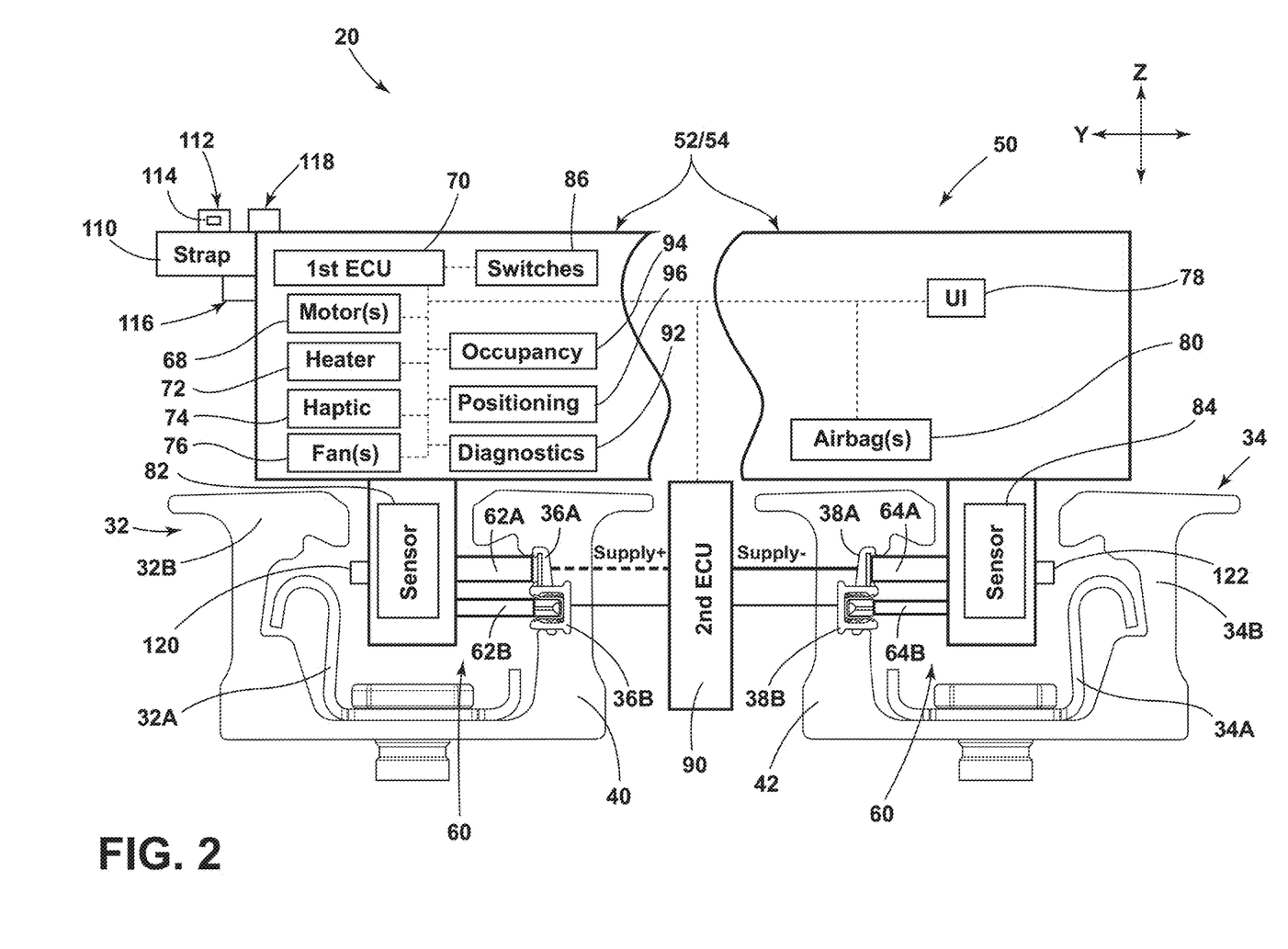
FIG. 2 is a side and schematic view of an embodiment of an electrical assembly according to teachings of the present disclosure.
Figure 2A:
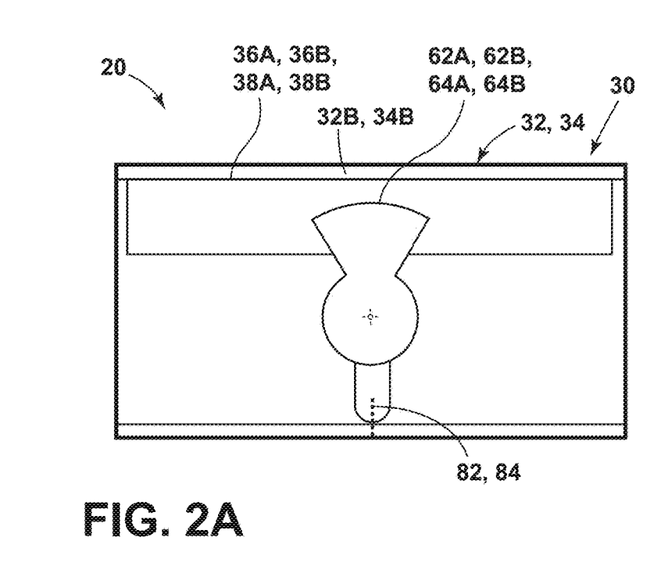
FIGS. 2A, 2B, and 2C are cross-sectional views of embodiments of a contact in engaged, partially engaged, and disengaged positions, respectively, relative to a conductor according to teachings of the present disclosure.

With embodiments, the track assembly 30 may include a first track 32 and/or a second track 34. As generally illustrated in FIG. 2, the first track 32 may include an inner track 32A and/or an outer track 32B. The second track 34 may include an inner track 34A and/or an outer track 34B. The inner tracks 32A, 34A may, for example and without limitation, include steel profiles and/or may be disposed at least partially within the outer tracks 32B, 34B. The outer tracks 32B, 34B may, for example and without limitation, include aluminum and/or may be about 40 mm tall. The track assembly 30 may include one or more conductors/bus bars (e.g., electrical conductors). For example, the first track 32 may include a first conductor 36A and/or a second conductor 36B. The second track 34 may include a first conductor 38A and/or a second conductor 38B. The first conductors 36A, 38A and/or the second conductors 36B, 38B may be connected to the outer tracks 32B, 34B and/or may be disposed at least partially in a wall 40, 42 of the outer tracks 32B, 34B.

In embodiments, a support assembly 50 may be configured for selective connection with the track assembly 30, such as via a connection system 60. The support assembly 50 may include a support member 52 that may be inserted at least partially into the track assembly 30 and may be configured to move or slide along the track assembly 30 (e.g., in the X-direction). The support assembly 50 may include the first ECU 70 (e.g., a seat ECU), a support member 52, and/or a seat 54 (e.g., a vehicle seat). The seat 54 may be connected to the support member 52 and/or may move with the support member 52 along the track assembly 30. While embodiments are described herein in connection with a seat 54, the support assembly 50 may include one or more other components that may be connected to and/or supported by the support member 52 in addition to or instead of a seat 54 (e.g., consoles, cargo, racks, etc.).

With embodiments, a connection system 60 may include one or more contacts 62A, 62B, 64A, 64B (e.g., electrical contacts) that may be configured for selective electrical connection with the conductors 36A, 36B, 38A, 38B of the track assembly 30. For example and without limitation, the contacts 62A, 62B, 64A, 64B may rotate into and out of operative/electrical contact with the conductors 36A, 36B, 38A, 38B (e.g., about an axis that may be substantially aligned/parallel with the Z-direction). The contacts 62A, 62B, 64A, 64B may provide an electrical connection between the track assembly 30 and the support member 52 (e.g., seat 54). Non-limiting examples of conductors 36A, 36B, 38A, 38B and contacts 62A, 62B, 64A, 64B are generally illustrated in FIGS. 2, 2A, 2B, 2C, and 3. The contacts 62A, 62B, 64A, 64B may for example and without limitation, include a straight and/or narrow blade configuration (see, e.g., FIG. 2), an arced or fan-like shape (see, e.g., FIGS. 2A-2C), and/or a rectangular configuration (see, e.g., FIG. 3).

With embodiments, the contacts 62A, 62B, 64A, 64B may be included in the connection system 60 that may be engaged to connect the support assembly 50 with the track assembly 30 and/or to move the support assembly 50, manually or automatically (e.g., via a motor 68), along the track assembly 30. For example and without limitation, removal of the support assembly 50 from the track assembly 30 may involve movement (e.g., rotation) of the contacts 62A, 62B, 64A, 64B such that the contacts 62A, 62B, 64A, 64B do not substantially restrict Z-direction movement of the support assembly 50.

In embodiments, the support assembly 50 may include one or more systems/functions that may use electrical power and/or that may be provided via one or more electrical loads/components. For example and without limitation, the seat 54 may be configured for powered movement, such as longitudinal movement, vertical movement, angular movement/titling, and/or rotational movement. Such movement may be conducted via one or more electric motors 68 that may be connected to and/or incorporated with the seat 54 and/or support member 52. Additionally or alternatively, the seat 54 may include other systems/functions, such as, for example and without limitation, heating (e.g., via an electric heater 72), massage/haptic alerts (e.g., via electronic haptic devices 74), cooling/venting (e.g., via an electric fan 76), among others. The first ECU 70 may be configured to control some or all of the systems of the support assembly

50. A user interface (UI) 78 may be connected to the first ECU 70 (e.g., directly and/or via the second ECU 90), such as to receive input from a user regarding one or more of the functions of the seat 54. The user interface 78 may include, for example and without limitation, one or more switches or buttons (e.g., physical and/or virtual switches/buttons) that may receive input from a user regarding movement, heating, massaging, and/or cooling of the seat 54. Upon receiving an input from the user interface 78, the first ECU 70 may be configured to activate the requested system/function.

With embodiments, one or more of the systems/functions of the seat 54 may use electrical power in a first/high range (e.g., may be high-power systems/functions). The first range may, for example and without limitation, include voltages of at least about 10 V, at least about 12 V, about 24 V, about 36 V, about 48 V, or higher or lower voltages, or voltages therebetween. When activated, such systems may obtain power from the power source 22 via the conductors 36A, 36B, 38A, 38B of the track assembly 30 and the contacts 62A, 62B, 64A, 64B of the support member 52.

In embodiments, the support assembly 50 may be configured to be connected to and/or disconnected/removed from the track assembly 30 in a plurality of locations. Disconnecting the support member 52 from the track assembly 30 may include disconnecting the contacts 62A, 62B, 64A, 64B of the support member 52 from the conductors 36A, 36B, 38A, 38B of the track assembly 30, which may involve metal components being separated from each other. If the voltage being provided to the support assembly 50 via the conductors 36A, 36B, 38A, 38B and contacts 62A, 62B, 64A, 64B and/or the current drawn by the support assembly 50 is above a threshold when the support assembly 50 is disconnected, a spark/arc may be generated between the conductors 36A, 36B, 38A, 38B and the contacts 62A, 62B, 64A, 64B as the contacts 62A, 62B, 64A, 64B move away from the conductors 36A, 36B, 38A, 38B. Such a spark/arc could harm or otherwise damage the conductors 36A, 36B, 38A, 38B, the contacts 62A, 62B, 64A, 64B, and/or one or more other components. Additionally or alternatively, a spark could interfere with the operation of one or more safety devices 80, such as airbags.

With embodiments, such as generally illustrated in FIGS. 2, 2A, 2B, and 2C, the support assembly 50 may include one or more sensors 82, 84 that may be configured to sense a status of the contacts 62A, 62B, 64A, 64B and/or the connection system 60. For example and without limitation, the support assembly 50 may include a sensor 82, 84 for each contact 62A, 62B, 64A, 64B and/or for each set of inner tracks 32A, 34A and outer tracks 32B, 34B. The sensors 82, 84 may be configured to detect/determine a rotational position of the contacts 62A, 62B, 64A, 64B. For example and without limitation, a rotational position of the contacts 62A, 62B, 64A, 64B may correspond to a connection status between the contacts 62A, 62B, 64A, 64B and the conductors 36A, 36B, 38A, 38B. The sensors 82, 84 may be configured to sense if the contacts 62A, 62B, 64A, 64B are in a first position (see, e.g., FIG. 2A), a second position (see, e.g., FIG. 2B), and/or a third position (see, e.g., FIG. 2C). In the first position, the contacts 62A, 62B, 64A, 64B may be connected with the conductors 36A, 36B, 38A, 38B of the track assembly 30 (e.g., sufficiently connected such that a spark/arc is not expected—see, e.g., FIG. 2A). When the contacts 62A, 62B, 64A, 64B are in the first position, the contacts 62A, 62B, 64A, 64B may be disposed substantially perpendicular to the track assembly 30. The first position and the third position may, for example, be about 90 degrees apart. The second position may, for example and without limitation, be about 15 degrees to about 65 degrees from the first position. The system 60 may not be in the third position (e.g., fully disengaged) until all contacts 62A, 62B, 64A, 64B are disconnected from corresponding conductors 36A, 36B, 38A, 38B.

Figure 2B:
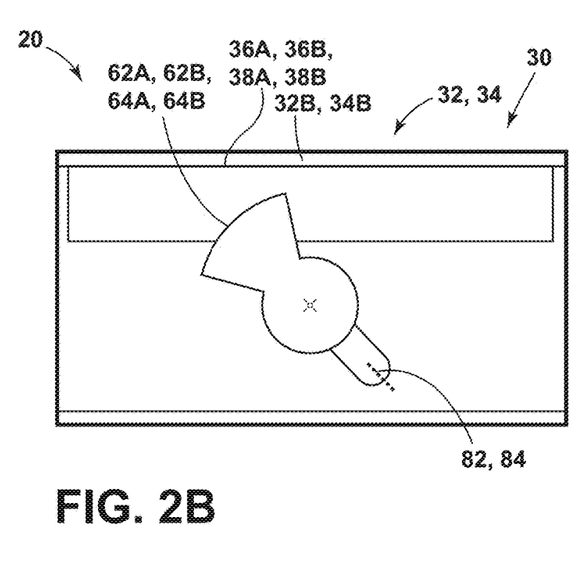
Figure 2C:
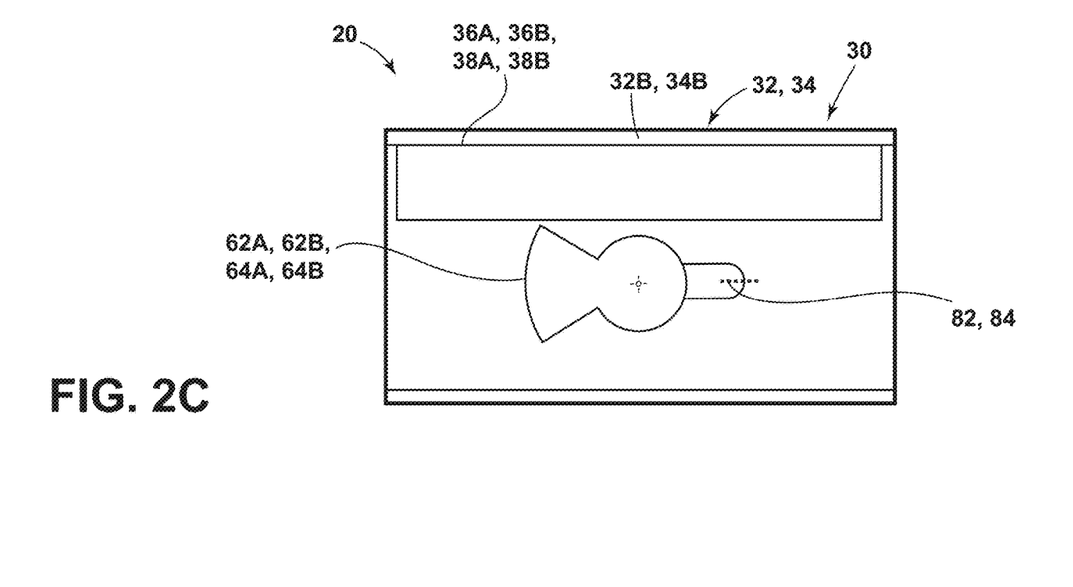
Figure 3:
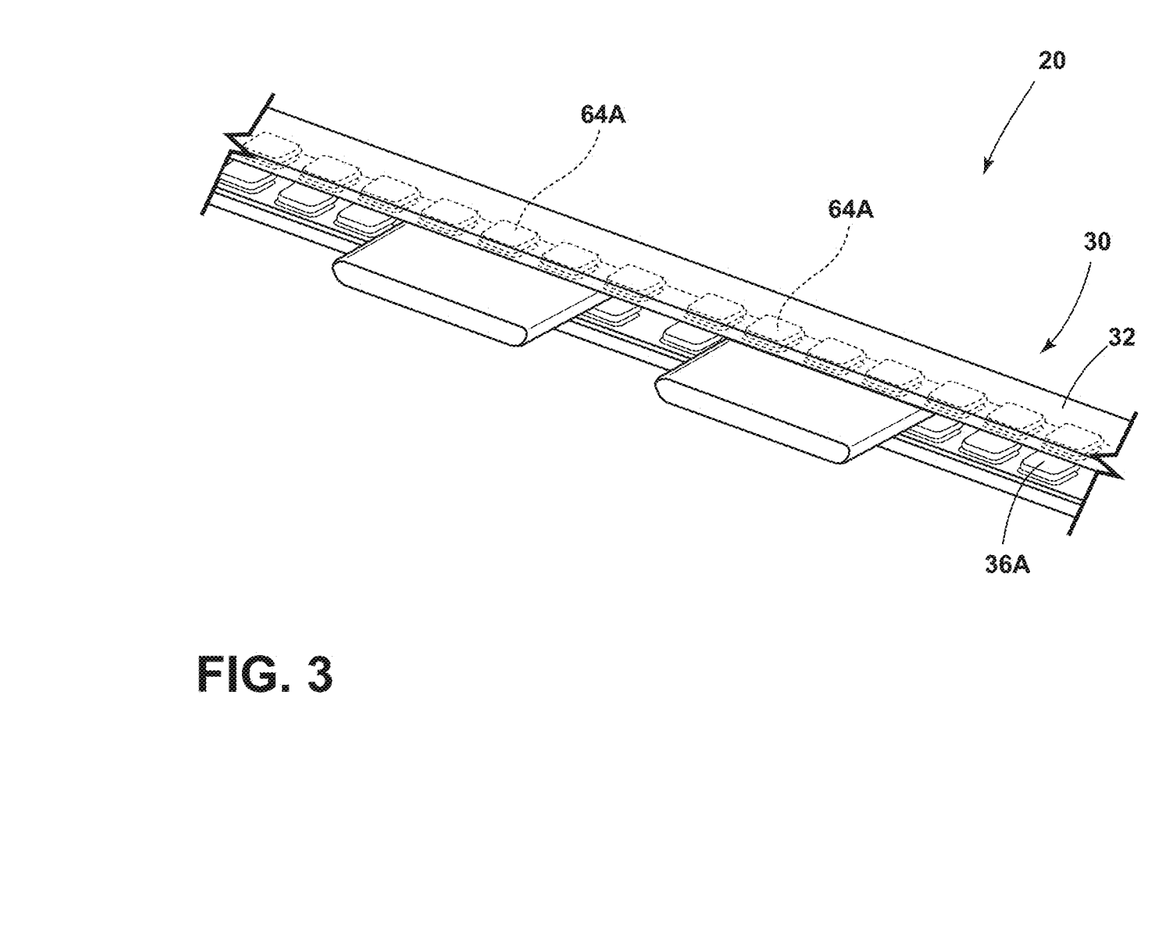
FIG. 3 is a perspective view of embodiments of a conductor and contacts electrical assembly according to teachings of the present disclosure.

In embodiments, when the contacts 62A, 62B, 64A, 64B are in a second position, the contacts 62A, 62B, 64A, 64B may be moving into and/or or out of connection with the conductors 36A, 36B, 38A, 38B (e.g., may be partially engaged—see, e.g., FIG. 2B). The second position may include any rotational position of the contacts 62A, 62B, 64A, 64B such that at least a portion of the contacts 62A, 62B, 64A, 64B is vertically aligned with a portion of the track assembly 30 and at least a portion of the contacts 62A, 62B, 64A, 64B is not vertically aligned with a portion of the track assembly 30. When the contacts 62A, 62B, 64A, 64B are in the third position (see, e.g., FIG. 2C), the contacts 62A, 62B, 64A, 64B may not be connected to the conductors 36A, 36B, 38A, 38B and/or may be disposed substantially parallel to the track assembly 30. In the third position, the contacts 62A, 62B, 64A, 64B may not be vertically aligned with the track assembly 30, and/or the support assembly 50 may be removed from (or inserted into) the track assembly 30. If the contacts 62A, 62B, 64A, 64B are not connected (e.g., electrically and/or mechanically) to the conductors 36A, 36B, 38A, 38B, such as in the third position, the connection system 60 may not be fully engaged. If the contacts 62A, 62B, 64A, 64B are partially engaged/connected with the conductors 36A, 36B, 38A, 38B, such as in the second position, lower power may be provided to the support assembly 50 and/or the first ECU 70 may continue to be powered.

In embodiments, the first ECU 70 may be connected to the one or more sensors 82, 84 and may control one or more electrical loads of the support assembly 50 according to (e.g., using, utilizing, based on, etc.) information from the one or more sensors 82, 84. For example and without limitation, the first ECU 70 may be configured to switch the support assembly 50 to (or maintain the support assembly 50 in) a low power mode, which may include at least temporarily disconnecting one or more electrical loads (e.g., via one or more switches 86) and/or causing one or more electrical loads to operate in a low-current mode if the connection system 60 is not fully/sufficiently engaged (e.g., at least one of the contacts 62A, 62B, 64A, 64B is in a second position). For example, if a user starts to disconnect a support assembly 50 (e.g., a seat 54) from the track assembly 30, the contacts 62A, 62B, 64A, 64B may rotate out of connection with the conductors 36A, 36B, 38A, 38B (e.g., out of the first position), the sensors 82, 84 may sense that the contacts 62A, 62B, 64A, 64B are about to move or have moved (e.g., started to move) out of a connected position, and/or the first ECU 70 may switch the support assembly 50 to the low power mode. Additionally or alternatively, the sensors 82, 84 may facilitate detection of a malfunction of the contacts 62A, 62B, 64A, 64B. For example and without limitation, if the support assembly 50 is connected with the track assembly 30 and a user is not attempting to remove the support assembly 50, but the connection system 60 is not fully engaged (e.g., contacts 62A, 62B, 64A, 64B are not in the first position or are only partially connected/engaged with the track assembly 30 and/or the conductors 36A, 36B, 38A, 38B), the first ECU 70 may detect a malfunction/error. If the first ECU 70 detects an error, the first ECU 70 may switch the support assembly 50 to a low power mode and/or may provide an indication to a user that an error has occurred, such as via the user interface 78.

In embodiments, the first ECU 70 may include a high-current mode and a low-current mode. The high-current mode may be a normal or fully functional mode in which the first ECU 70 draws a higher level of current (compared to the low-current mode). The low-current mode may be a reduced operation mode in which the first ECU 70 may perform some functions, but may not perform all functions, and may draw a lower level of current compared to the high-current mode. The first ECU 70 may be configured to switch from the high-current mode to the low-current mode if the status of the connection system 60 is not fully engaged (e.g., if the contacts 62A, 62B, 64A, 64B are in the second position).

With embodiments, the second ECU 90 may have a first mode in which the second ECU 90 is configured to provide power in the first range and/or may include a second mode in which the second ECU 90 is configured to provide power in a second range that may be lower than the first range. The second range may, for example and without limitation, include voltages of about 8 V or less, about 6 V, about 5 V, about 5 V to about 6 V, or higher or lower voltages or voltages therebetween. The second range may be sufficient for the first ECU 70 to operate, and/or for one or more lower power seat systems to operate. For example and without limitation, a diagnostics system 92, an occupancy system/sensor 94, and/or a seat positioning system 96 may be configured to operate with the second range. Other systems/functions may not be configured to operate in the second range (e.g., motors 68, heaters 72, haptic devices 74, etc.). A spark may not be expected to be generated if the contacts 62A, 62B, 64A, 64B are disconnected from the conductors 36A, 36B, 38A, 38B while power is provided in the second range and/or if the first ECU 70 has switched the support assembly 50 to a low power mode.

Figure 4:
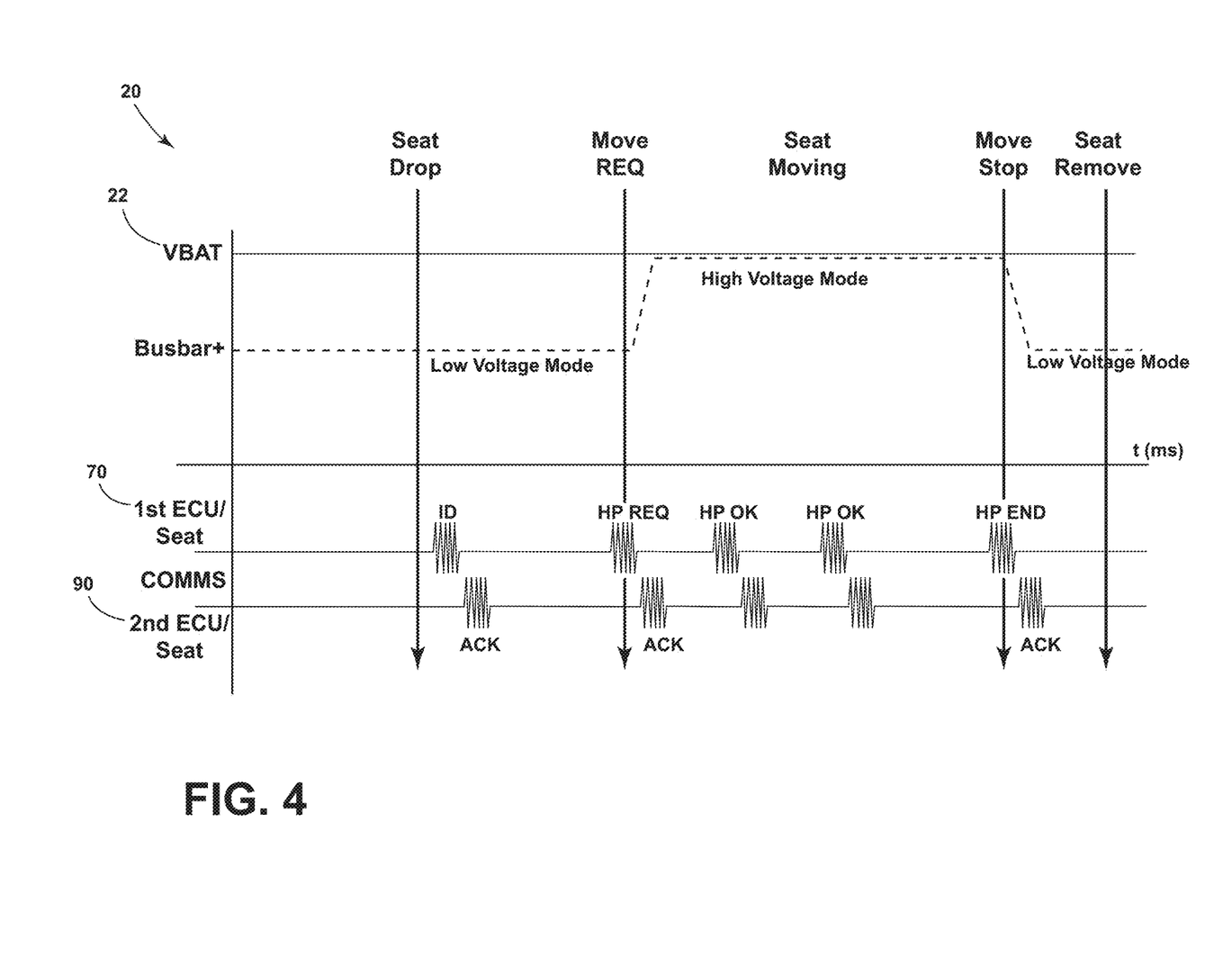
FIG. 4 is a graphical representation of communications between a first ECU and a second ECU in an embodiment of an electrical assembly according to teachings of the present disclosure.

In embodiments, such as generally illustrated in FIG. 4, the second ECU 90 may operate in the first mode and provide power in the first range when use of a high-power system is requested by a user or is currently being used, and the second ECU 90 may operate in the second mode and provide power in the second range when use of seat systems is not requested or seat systems are no longer being used. As generally illustrated, the second ECU 90 may initially provide power in the second/low range (e.g., the second mode may be the default mode). As the support member 52 and/or the seat 54 is connected to (or "dropped" vertically into) the track assembly 30, the second ECU 90 may continue to operate in the second mode. If a user wants to use one of the high-power seat systems/functions, the user may provide input via the user interface 78 and the first ECU 70 may send a request (or some form of indication) to the second ECU 90 to switch to the first/high mode. The second ECU 90 may receive the request from the first ECU 70, switch to the first/high mode, and provide power in the first range to the track assembly 30. The second ECU 90 may send an acknowledgement message (or some form of indication) to the first ECU 70 when the second ECU 90 has switched to the first/high mode. The first ECU 70 may be configured to activate the requested system when the first ECU 70 receives the acknowledgement message and/or determines that power in the first range is being provided to the track assembly 30. For example and without limitation, once the second ECU 90 has switched to the first mode, the first ECU 70 may actuate one or more seat motors 68 to move the support assembly 50 (e.g., seat 54) along the track assembly 30. If the second ECU 90 is not in the first mode, the first ECU 70 may not actuate the requested system (e.g., the requested system(s) may not operate in the second range).

With embodiments, the second ECU 90 may be connected to the sensors 82, 84 of the support assembly 50, such as directly and/or via the first ECU 70. The second ECU 90 may switch to (or remain in) the second mode if the second ECU 90 determines via the sensors 82, 84 that the connection system 60 is not fully engaged.

With embodiments, while a high-power system is active, the first ECU 70 may provide indications of the status of the system (e.g., that the system is still active) to the second ECU 90. The second ECU 90 may receive the indications and may remain in the first mode as long as the system is still active. When the system is no longer active (e.g., the user inputs a request to stop the system or the system times out), the first ECU 70 may send a second request/message to the second ECU 90 to switch to the second mode. The second ECU 90 may switch back to the second mode upon receiving the second request/message. There may be a delay between the first ECU 70 transmitting a request and the second ECU 90 switching modes (see, e.g., FIG. 4). If the second ECU 90 fails to receive a status indication for a period of time, the second ECU 90 may automatically switch back to the second mode and/or may request a status indication from the first ECU 70.

In embodiments, electrical loads of the support assembly 50 may include passive loads and/or active/smart loads. The first ECU 70 may be configured to operate the one or more active/smart loads in a low current mode to reduce the risk of sparking/arcing. The second ECU 90 may be configured to operate in the second mode to provide a lower voltage to the support assembly 50 (e.g., for the passive loads), which may reduce the risk of sparking/arcing. The first ECU 70 may be configured to operate the support assembly 50 in a low power mode and the second ECU 90 may be configured to operate in the second mode at the same time (e.g., the ECUs 70, 90 may operate the electrical assembly in a low-current and low-voltage mode), which may minimize the risk of sparking/arcing.

Figure 5:
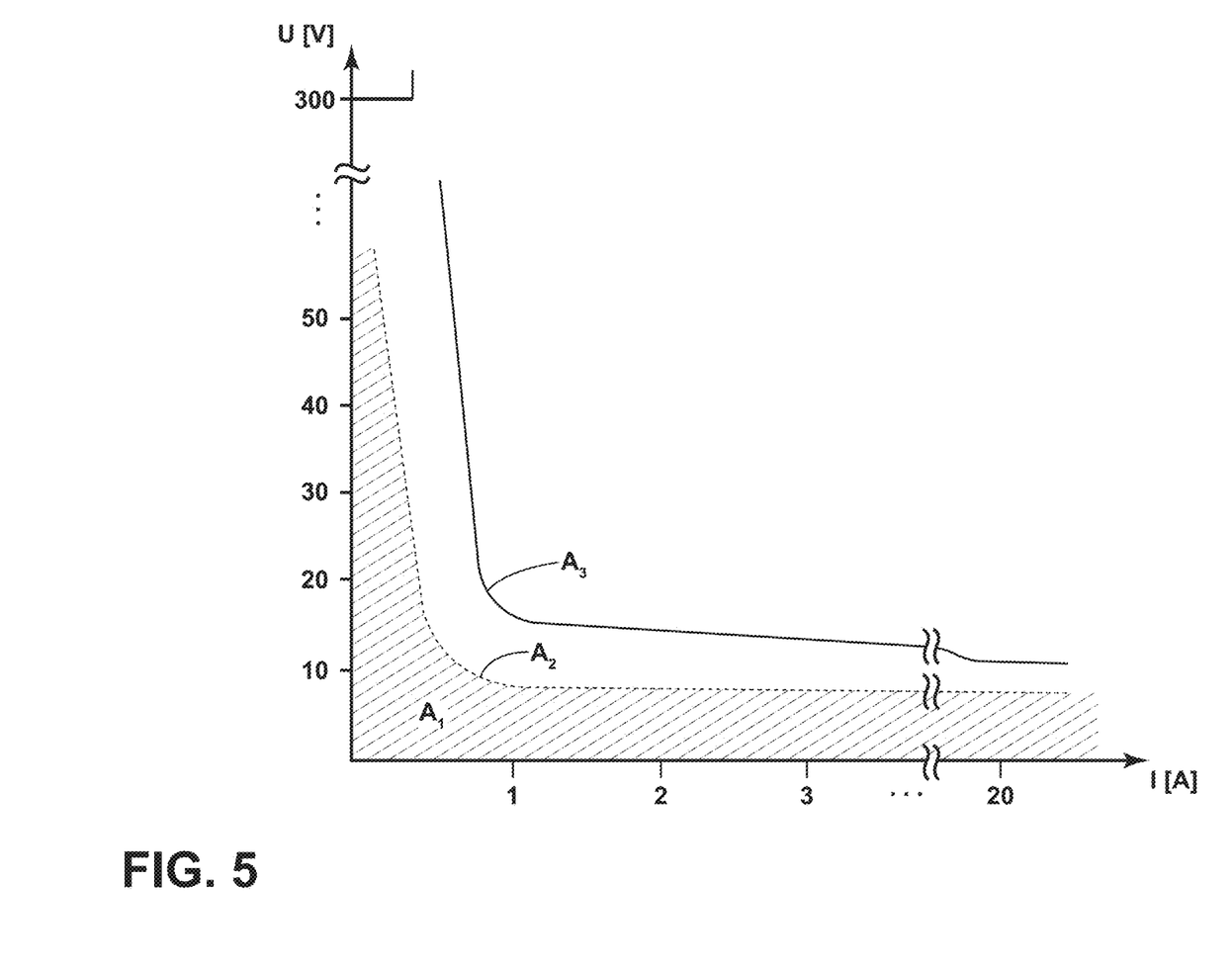
FIG. 5 is a graphical representation of electrical current and voltage of embodiments of electrical assemblies according to teachings of the present disclosure.

In embodiments, the first ECU 70 and the second ECU 90 may cooperate to maintain the voltage and current of the support assembly 50 below threshold values if the support assembly 50 is being removed (e.g., longitudinally) and/or if the connection system 60 is not fully engaged, such as generally illustrated in FIG. 5. A first current/voltage threshold $A_1$ may correspond to a region where arcing does not occur or is unlikely to occur when disconnecting the support assembly 50 from the track assembly 30. A second current/voltage threshold $A_2$ may correspond to a region where arcing is possible; for example and without limitation, short arcing may be possible when disconnecting the support assembly 50 from the track assembly 30. A third current/voltage threshold $A_3$ may correspond to a region where arcing is expected; for example and without limitation, full arcs may be likely when removing the support assembly 50 from the track assembly 30. For example and without limitation, if the support assembly 50 is being removed and/or the connection system 60 is not fully engaged and the current draw of the support assembly 50, which may be controlled at least in part via the first ECU 70, is relatively low (e.g., less than 0.5 A), the second ECU 90 may provide a relatively high voltage. Additionally or alternatively, if the support assembly 50 is being removed and/or the connecting system 60 is not fully engaged and the current draw of the support assembly 50 is relatively high (e.g., about 1 A or more), the second ECU 90 may provide a relatively low voltage to the support assembly 50 (e.g., may operate in the second mode).

In embodiments, the second ECU 90 and the first ECU 70 may be configured to communicate with each other. For example and without limitation, the first ECU 70 may include a first communication device 100 and/or the second ECU 90 may include a second communication device 102. The first communication device 100 and/or the second communication device 102 may be configured to communicate via wireless and/or wired methods, such as, for example and without limitation, power line communication (PLC), controller area network (CAN), and/or frequency multiplexing, among others.

With embodiments, the support assembly 50 may include an actuator 110 configured for removing the seat and the support member from the track assembly (see, e.g., FIG. 2). The actuator 110 may, for example and without limitation, include a strap or a lever. The actuator 110 may be configured to unlock one or more locking members 120, 122 that may limit movement of the support member 52 in at least one direction. A sensor 112 may be connected to the actuator 110 to sense when a user contacts and/or actuates the actuator 110 (e.g., when a user attempts to remove the support assembly 50 from the track assembly 30). The first ECU 70 and/or the second ECU 90 may be connected to the sensor 112. If contact/actuation by a user is sensed, the first ECU 70 may stop any high-power systems of the support member 52 (e.g., motors, heaters, etc.) that may be active, may switch the support assembly 50 to the low-current mode, and/or may send a request to the second ECU 90 to switch to the second mode. The sensor 112 may, for example and without limitation, include a capacitive sensor 114. In embodiments, an indicator 116 may be connected to and/or proximate the actuator 110, the support member 52, and/or the seat 54 and may provide an indication (e.g., visual and/or audible) of whether the actuator 110 can/should be actuated. The first ECU 70 may control the indicator 116. For example and without limitation, the indicator 116 may include a light emitting diode (LED). The first ECU 70 may cause the LED (e.g., the indicator 116) to emit a first color of light (e.g., red) if the second ECU 90 is in the first mode, and/or the first ECU 70 may cause the LED (e.g., the indicator 116) to emit a second color of light (e.g., green) if the second ECU 90 is in the second mode.

In embodiments, a blocker 118 may be connected to the support assembly 50 and may restrict/prevent disconnection of the support assembly 50 from the track assembly 30 while the second ECU 90 is in the first mode and while the support assembly 50 is in a high-current mode. The blocker 118 may selectively engage (e.g., mechanically) the track assembly 30 and/or may engage the actuator 110 to limit/prevent actuation of the actuator 110. The first ECU 70 may control operation of the blocker 118. For example and without limitation, if the second ECU 90 is in the first mode and/or the support assembly 50 is in a high-current mode, the first ECU 70 may operate (or maintain) the blocker 118 in a blocking state. If the second ECU 90 is in the second mode and/or the support assembly 50 is in a lower-current mode, the first ECU 70 may operate the blocker 118 in an unblocked state. With embodiments, the support assembly 50 may include an occupancy sensor 94 that may be connected to the first ECU 70. If the occupancy sensor 94 senses whether a seat 54 is occupied, the first ECU 70 may operate (or maintain) the blocker 118 in a blocking state to prevent disconnection/removal of the occupied seat 54. The blocker 118 may include one or more of a variety of configurations. For example and without limitation, the blocker 118 may include a solenoid, a lever, a cam, and/or other configurations.

With embodiments, the blocker 118 may be active/engaged while the second ECU 90 is in the first mode, and may be deactivated/disengaged once the second ECU 90 is in the second mode, such as after a sudden stop of high power usage by the support assembly 50 and/or after movement of the support assembly 50 is completed. In some circumstances, movement of the support assembly 50 may need to stop before the blocker 118 is engaged. Additionally or alternatively, a request for low power from one support assembly 50 may stop movement of another support assembly 50.

In embodiments, a sensor 82, 84 may, for example, be configured as a normally-open switch. Disengaging the contacts 62A, 62B, 64A, 64B may include closing the switch, which may reduce power consumption.

With embodiments, the contacts 62A, 62B, 64A, 64B may translate (e.g., extend/retract in the Y-direction and/or Z-direction) into and/or out of engagement with the conductors 36A, 36B, 38A, 38B, such as instead of or in addition to rotating about a vertical axis. A sensor 82, 84 may be configured as an additional contact that may be shorter than the contacts 62A, 62B, 64A, 64B, such that the sensor 82, 84 disengages from the conductors 36A, 36B, 38A, 38B before the contacts 62A, 62B, 64A, 64B (e.g., a sensor signal may have relatively low current so there may be practically no risk of arcing). Additionally or alternatively, the contacts 62A, 62B, 64A, 64B may tilt (e.g., rotate about a longitudinal axis) into and/or out of engagement with the conductors 36A, 36B, 38A, 38B.

In embodiments, a second position of the contacts 62A, 62B, 64A, 64B may disengage a sensor 82, 84, but may not disengage the contacts 62A, 62B, 64A, 64B from the conductors 36A, 36B, 38A, 38B. For example and without limitation, the contacts 62A, 62B, 64A, 64B may be in the same place in the first and second positions, but, in the second position, the contacts 62A, 62B, 64A, 64B may be permitted to move to the third position (e.g., the contacts 62A, 62B, 64A, 64B may be unlocked, and/or the second position may function as a "ready to disengage" state of the contacts 62A, 62B, 64A, 64B).

Figure 6:
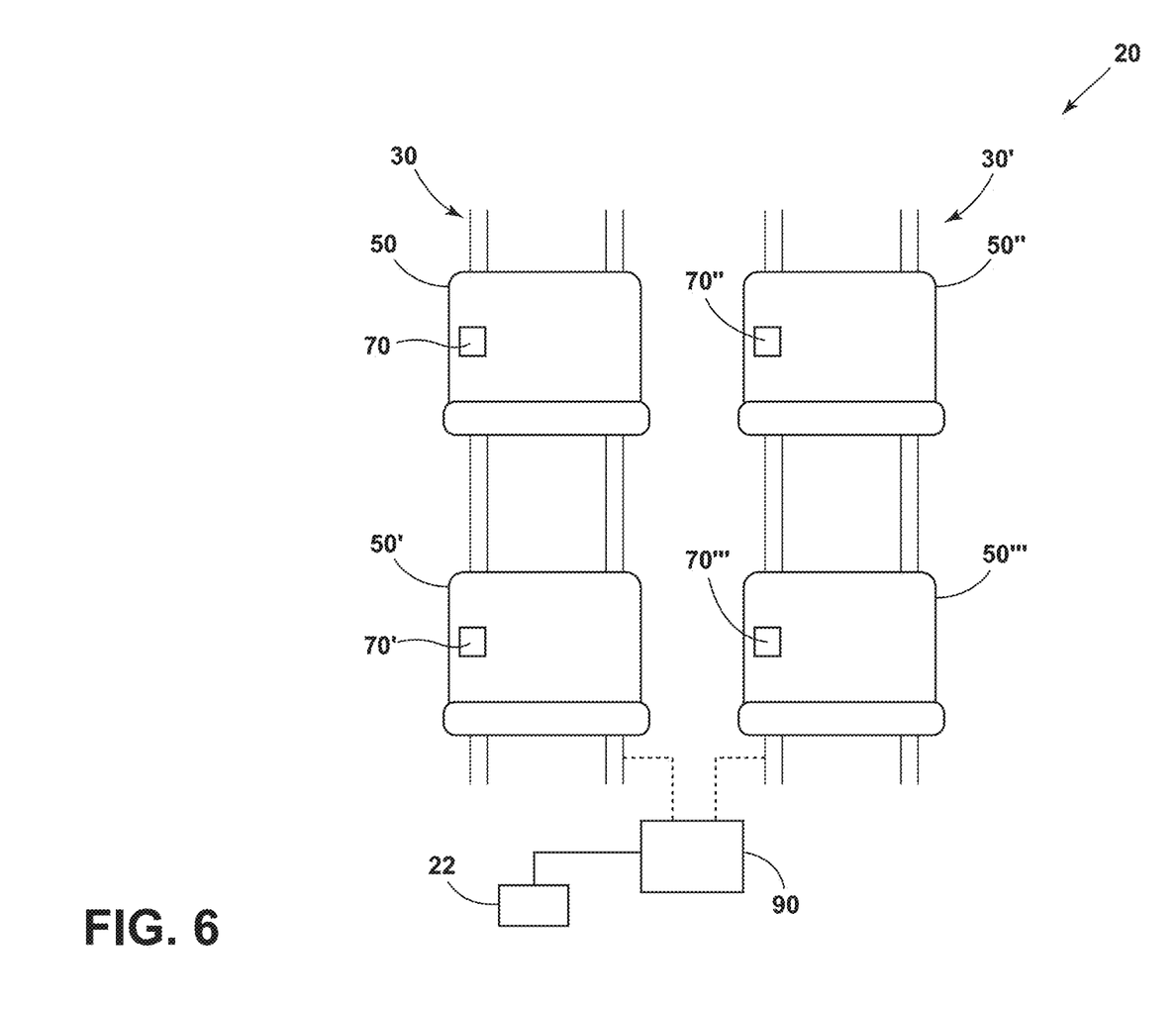
FIG. 6 is a top view an of an embodiment of an electrical assembly according to teachings of the present disclosure.

With embodiments, such as generally illustrated in FIG. 6, an electrical assembly 20 may include more than one support assembly 50 that may be connected to the track assembly 30 (e.g., more than one seat 54 may be connected to the same track assembly 30). For example and without limitation, a second support assembly 50', a third support assembly 50'', and/or a fourth support assembly 50''' may be connected to the track assembly 30. Some or all of the support assemblies 50, 50', 50'', 50''' may include a corresponding first ECU 70, 70', 70'', 70'''. The electrical assembly 20 may include a second track assembly 30' that may be configured substantially the same as the track assembly 30. The second ECU 90 may provide substantially the same power to any support assembly 50, 50', 50'', 50''' connected to a track assembly 30, 30'. If a first support assembly 50 is operating a high-power system (e.g., energizing motors 68 to move a seat 54) and a user attempts to remove a second support assembly 50' from the track assembly 30, a blocker 118 may initially prevent removal of the second support assembly 50' the first ECU 70' of the second support assembly 50' may send a request to the second ECU 90 to shift to the second mode, the second ECU 90 and/or the first ECU 70' of the second support assembly 50' may send a message to the first ECU 70 of the first support assembly 50 to stop the high-power system, the first ECU 70 of the first support assembly 50 may stop the high power system, the blocker 118 may be disengaged once the second ECU 90 of the first support assembly 50 is in the second mode, and/or then the user may be permitted to remove the second support assembly 50' from the track assembly 30. Additionally or alternatively, a blocker 118 may prevent removal of the second support assembly 50' until the use of the high-power system of the first support assembly 50 is complete.

In embodiments, an ECU (e.g., the first ECU 70 and/or the second ECU 90) may include an electronic controller and/or include an electronic processor, such as a programmable microprocessor and/or microcontroller. In embodiments, an ECU may include, for example, an application specific integrated circuit (ASIC). An ECU may include a central processing unit (CPU), a memory (e.g., a non-transitory computer-readable storage medium), and/or an input/output (I/O) interface. An ECU may be configured to perform various functions, including those described in greater detail herein, with appropriate programming instructions and/or code embodied in software, hardware, and/or other medium. In embodiments, an ECU may include a plurality of controllers. In embodiments, an ECU may be connected to a display, such as a touchscreen display.

Various examples/embodiments are described herein for various apparatuses, systems, and/or methods. Numerous specific details are set forth to provide a thorough understanding of the overall structure, function, manufacture, and use of the examples/embodiments as described in the specification and illustrated in the accompanying drawings. It will be understood by those skilled in the art, however, that the examples/embodiments may be practiced without such specific details. In other instances, well-known operations, components, and elements have not been described in detail so as not to obscure the examples/embodiments described in the specification. Those of ordinary skill in the art will understand that the examples/embodiments described and illustrated herein are non-limiting examples, and thus it can be appreciated that the specific structural and functional details disclosed herein may be representative and do not necessarily limit the scope of the embodiments.

Reference throughout the specification to "examples", "in examples," "with examples," "various embodiments," "with embodiments," "in embodiments," or "an embodiment," or the like, means that a particular feature, structure, or characteristic described in connection with the example/embodiment is included in at least one embodiment. Thus, appearances of the phrases "examples", "in examples," "with examples," "in various embodiments," "with embodiments," "in embodiments," or "an embodiment," or the like, in places throughout the specification are not necessarily all referring to the same embodiment. Furthermore, the particular features, structures, or characteristics may be combined in any suitable manner in one or more examples/embodiments. Thus, the particular features, structures, or characteristics illustrated or described in connection with one embodiment/example may be combined, in whole or in part, with the features, structures, functions, and/or characteristics of one or more other embodiments/examples without limitation given that such combination is not illogical or non-functional. Moreover, many modifications may be made to adapt a particular situation or material to the teachings of the present disclosure without departing from the scope thereof.

It should be understood that references to a single element are not necessarily so limited and may include one or more of such element. Any directional references (e.g., plus, minus, upper, lower, upward, downward, left, right, leftward, rightward, top, bottom, above, below, vertical, horizontal, clockwise, and counterclockwise) are only used for identification purposes to aid the reader's understanding of the present disclosure, and do not create limitations, particularly as to the position, orientation, or use of examples/embodiments.

Joinder references (e.g., attached, coupled, connected, and the like) are to be construed broadly and may include intermediate members between a connection of elements and relative movement between elements. As such, joinder references do not necessarily imply that two elements are directly connected/coupled and in fixed relation to each other. The use of "e.g." in the specification is to be construed broadly and is used to provide non-limiting examples of embodiments of the disclosure, and the disclosure is not limited to such examples. Uses of "and" and "or" are to be construed broadly (e.g., to be treated as "and/or"). For example and without limitation, uses of "and" do not necessarily require all elements or features listed, and uses of "or" are inclusive unless such a construction would be illogical.

While processes, systems, and methods may be described herein in connection with one or more steps in a particular sequence, it should be understood that such methods may be practiced with the steps in a different order, with certain steps performed simultaneously, with additional steps, and/or with certain described steps omitted.

All matter contained in the above description or shown in the accompanying drawings shall be interpreted as illustrative only and not limiting. Changes in detail or structure may be made without departing from the present disclosure.

It should be understood that an electronic control unit (ECU), a system, and/or a processor as described herein may include a conventional processing apparatus known in the art, which may be capable of executing preprogrammed instructions stored in an associated memory, all performing in accordance with the functionality described herein. To the extent that the methods described herein are embodied in software, the resulting software can be stored in an associated memory and can also constitute means for performing such methods. Such a system or processor may further be of the type having ROM, RAM, RAM and ROM, and/or a combination of non-volatile and volatile memory so that any software may be stored and yet allow storage and processing of dynamically produced data and/or signals.

It should be further understood that an article of manufacture in accordance with this disclosure may include a non-transitory computer-readable storage medium having a computer program encoded thereon for implementing logic and other functionality described herein. The computer program may include code to perform one or more of the methods disclosed herein. Such embodiments may be configured to execute via one or more processors, such as multiple processors that are integrated into a single system or are distributed over and connected together through a communications network, and the communications network may be wired and/or wireless. Code for implementing one or more of the features described in connection with one or more embodiments may, when executed by a processor, cause a plurality of transistors to change from a first state to a second state. A specific pattern of change (e.g., which transistors change state and which transistors do not), may be dictated, at least partially, by the logic and/or code.

What is claimed is:

1. An electrical assembly, comprising:
   a support assembly configured for selective connection with a track assembly;

a connection system including an electrical contact connected to the support assembly, the electrical contact configured for selective electrical connection with said track assembly;

an electrical load connected to the support assembly;

a sensor configured to sense a status of the connection system, including whether the connection system is fully engaged, partially engaged, or not engaged; and an electronic control unit (ECU) configured to communicate with the sensor and the support assembly;

wherein the ECU is configured to disconnect the electrical load and/or cause the electrical load to operate in a low-current mode if the status of the connection system is partially engaged.

2. The electrical assembly of claim 1, including an additional ECU connected to said track assembly;

wherein the additional ECU is configured to communicate with at least one of the ECU and the sensor; and the additional ECU is configured to supply a reduced voltage if the status of the connection system is partially engaged.

3. The electrical assembly of claim 2, wherein the reduced voltage is about 5 V or less; and the ECU is connected to move with the support assembly.

4. The electrical assembly of claim 1, including one or more additional electrical loads;

wherein the electrical load is a motor and at least one of the one or more additional electrical loads includes a heater.

5. The electrical assembly of claim 1, wherein the ECU includes an ECU high-current mode and an ECU low-current mode; and the ECU is configured to switch from the ECU high-current mode to the ECU low-current mode if the status of the connection system is partially engaged.

6. The electrical assembly of claim 1, wherein the electrical contact is configured to rotate about a vertical axis.

7. The electrical assembly of claim 1, wherein the electrical contact includes a fully engaged position in which the electrical contact is in contact with a conductor of said track assembly; and the electrical contact includes a disengaged position in which the electrical contact is not in contact with said conductor.

8. The electrical assembly of claim 7, wherein the electrical contact is configured to rotate to the disengaged position such that the electrical contact does not restrict removal of the support assembly from said track assembly.

9. The electrical assembly of claim 1, including:

a second electrical contact configured for selective electrical connection with a second track of the track assembly; and a second sensor;

wherein the electrical contact is configured for selective electrical connection with a first track of the track assembly;

the connection system is not fully disengaged until either of the electrical contact and the second electrical contact are disconnected from the first track and the second track, respectively;

the sensor is configured to detect a position of the electrical contact; and the second sensor is configured to detect a position of the second electrical contact.

10. The electrical assembly of claim 9, wherein the first track includes a first inner track, a first outer track, and a first conductor disposed at least partially in a wall of the first outer track;

the second track includes a second inner track, a second outer track, and a second conductor disposed at least partially in a wall of the second outer track;

the electrical contact is configured for selective electrical connection with the first conductor; and the second electrical contact is configured for selective electrical connection with the second conductor.

11. The electrical assembly of claim 10, wherein the electrical contact is configured for selective electrical connection with the second conductor; and the second electrical contact is configured for selective electrical connection with the first conductor.

12. An electrical assembly, comprising:

a track assembly;

a support assembly configured for selective connection with the track assembly;

an electronic control unit (ECU) connected to the track assembly and configured to provide power from a power source to the track assembly; and wherein the ECU has a first mode in which the ECU provides power in a first voltage range to the track assembly;

the ECU has a second mode in which the ECU provides power in a second voltage range to the track assembly;

the ECU is configured to switch between the first mode and the second mode according to information regarding the support assembly; and wherein the ECU is configured to switch between the first mode and the second mode according to the information regarding the support assembly to reduce a risk of sparking.

13. The electrical assembly of claim 12, wherein the first voltage range includes voltages of at least about 12 V.

14. The electrical assembly of claim 13, wherein the second voltage range includes voltages of about 8 V or less.

15. The electrical assembly of claim 13, wherein the second voltage range includes voltages of about 5 V.

16. The electrical assembly of claim 12, wherein the first voltage range includes voltages of at least about 36 V.

17. The electrical assembly of claim 12, including a blocker;

wherein the ECU is configured to control the blocker to restrict disconnection of the support assembly from the track assembly when the ECU is in the first mode.

18. The electrical assembly of claim 17, including an occupancy sensor connected to the blocker;

wherein the blocker is configured to restrict disconnection of the support assembly from the track assembly when the ECU determines that the support assembly is occupied via the occupancy sensor.

19. An electrical assembly, comprising:

a track assembly;

a support assembly configured for selective connection with the track assembly;

an electronic control unit (ECU) connected to the track assembly and configured to provide power from a power source to the track assembly; and wherein the ECU has a first mode in which the ECU provides power in a first voltage range to the track assembly;

the ECU has a second mode in which the ECU provides power in a second voltage range to the track assembly;

the ECU is configured to switch between the first mode and the second mode according to information regarding the support assembly;

wherein the support assembly includes an additional ECU, a support member connected to the track assembly, and a seat connected to move with the support member; and the electrical assembly further includes a switch connected to the additional ECU and configured to receive user input.

20. The electrical assembly of claim 19, wherein the ECU is configured to switch between the first mode and the second mode according to the information regarding the support assembly to reduce a risk of sparking.

\* \* \* \* \*